Figure 3:
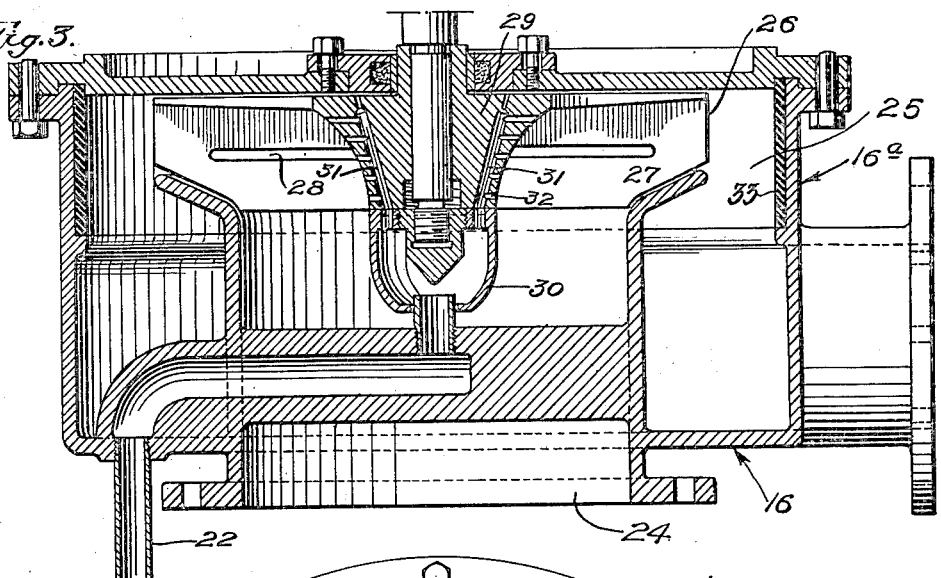

Oct. 30, 1934.  D. W. BOWERS  1,979,189
METHOD OF GAS SCRUBBING
Filed July 18, 1933   3 Sheets-Sheet 1
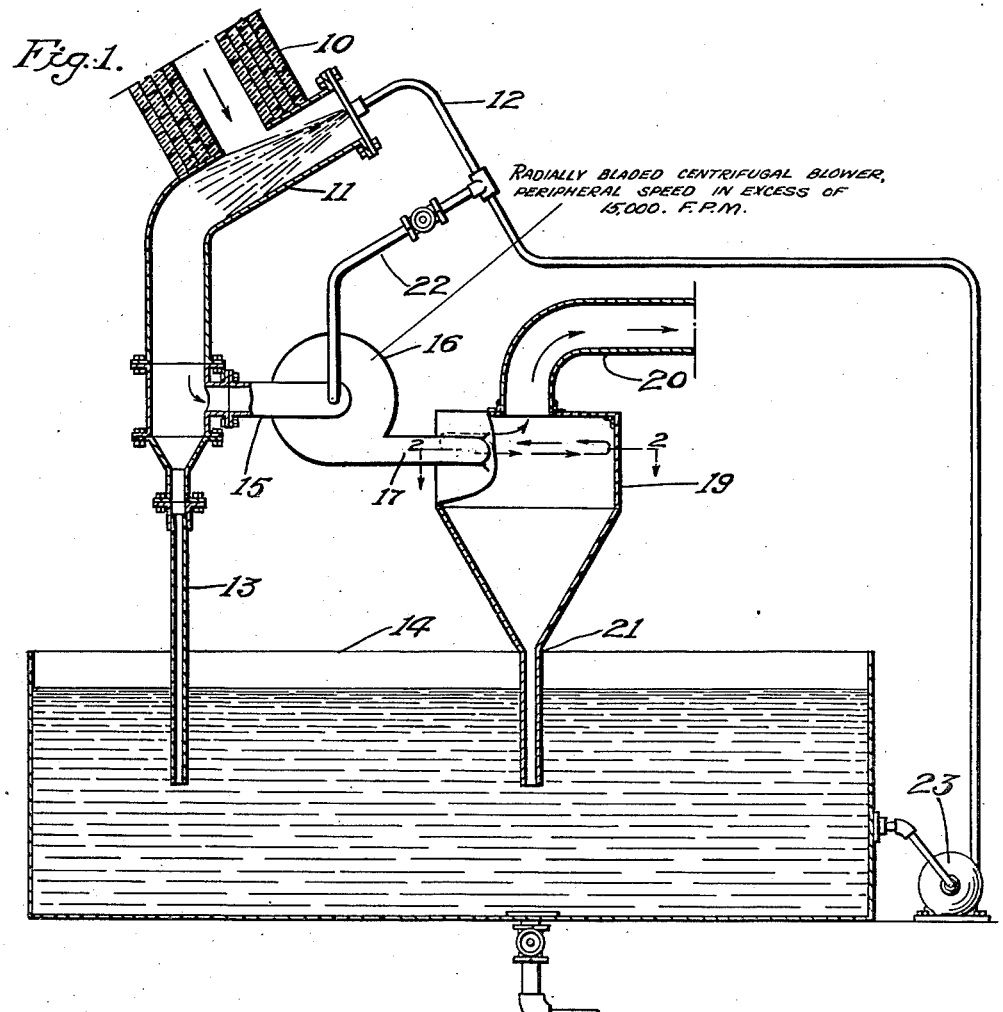
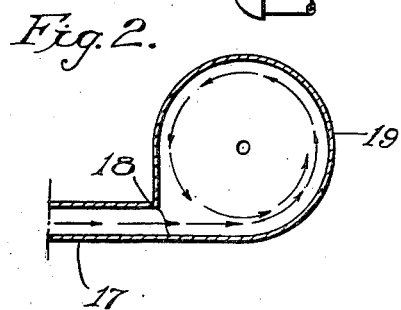
Inventor:—
Dana W. Bowers
by his Attorneys
Howson & Howson Oct. 30, 1934.   D. W. BOWERS   1,979,189
METHOD OF GAS SCRUBBING
Filed July 18, 1933   3 Sheets-Sheet 3

Patented Oct. 30, 1934

1,979,189

UNITED STATES PATENT OFFICE 1,979,189

METHOD OF GAS SCRUBBING

Dana W. Bowers, Philadelphia, Pa.

Application July 18, 1933, Serial No. 681,036

15 Claims. (Cl. 183—121)

This invention is a continuation in part of my prior application for Method of gas scrubbing, filed December 3, 1932, Serial No. 645,660 and relates to methods of and apparatus for gas treatment, not only for removal of solids from gases, but also for gas absorption, rapid and intimate contact of liquids and gases, and when desired, solids entrained in the gases or liquids.

The principle employed in this method of gas treatment comprises bombardment of a gas or mixture thereof by a washing liquid in the form of relatively large drops, which drops are caused to traverse a space through which the gas passes and at a much greater velocity than that employed in any previous method or means, the velocity of the said drops being equal to or in excess of the velocity of the passing gases and causing the said drops to impinge upon a surface which surface comprises the peripheral housing of a radially bladed impeller and so spaced therefrom as to be substantially within range of the maximum ballistic force of the said drops traversing the said space. Further, this invention comprises delivery of washing liquid in substantially unbroken streams from the hub of the said impeller and throughout the length of the impeller blades, at the outer ends of which the said liquid streams dissociate into series of drops of appreciable size, approximating 1 to 4 millimetres in diameter, the said drops leaving the blade ends substantially at the peripheral velocity thereof and with the least practicable fine atomization of the liquid and the said peripheral velocity being maintained at or in excess of 11,500 feet per minute.

It is well known that in scrubbing a gas to remove suspended dust, fume and the like therefrom, great difficulty is encountered in obtaining a high elimination of solids from the gas when the particles of fume are exceedingly fine, for example, less than one micron in diameter and when the gas is passed through a scrubbing means comprising a single stage. It has been, therefore, customary in most previous gas scrubbing treatments to pass the gases and washing liquid at a moderate velocity, seldom in excess of 3,000 feet per minute, through the scrubbing means and generally to prolong time contact of the gas and washing liquid, consistent with natural capillary time i. e., that time necessary for the washing fluid to spread itself over the surface of solids contained in the gas, by means of multiple stages or a long and ofttimes tortuous path to effect the desired wetting of the particle surface.

Attempts to thus remove fume particles by wet washing means have been attended by inefficiencies approximating ten to twenty percent of the fume content.

An important difficulty attending wetting of fume particles, by commingling a fume laden gas and a liquid by any method hitherto known, is the formation of gas bubbles with a skin or partially wetted fume, which bubbles contain dry fume in their interior. Failure of a portion of these gas bubbles to break while passing through the washing means results in loss of dry fume which accompanies the output gas.

Many attempts have been made to produce an apparatus which would insure intimate contact of the fume particles and the wetting liquid, the liquid generally comprising a vapor or exceedingly fine mist, but in any case the wetting action has been practically wholly dependent upon intimate diffusion and capillary attraction of the mist and fume particles.

It is well known that capillary attraction is retarded by gas surface tension, regardless of the intimacy of the mixture of the dry and wet components of a gas. In such devices this retardation, therefore, necessitates maintenance of the mixture through an extended time interval for any satisfactory wetting of the dry elements.

Gas scrubbing devices now in common use may be roughly divided into three types: disintegrators, centrifugals, and washing towers. The disintegrator type washer, as the name implies, disintegrates the washing liquid to a fine mist and commingles the gas therewith, the action occurring by means of alternate rotating and fixed members through which the gas and washing liquid are caused to pass; a minor portion of the fume particles entrained in the gas are forcibly wetted by direct contact with the various parts of the apparatus, while the major portion is wholly dependent upon capillary time contact to complete the wetting.

In the centrifugal type washer, the washing liquid is dispersed from the periphery of a series of inverted cones and at a low velocity while the gas is caused to pass through the dispersed liquid, thereby commingling the liquid with entrained fume particles, but lacking sufficient impact to destroy gas surface tension to a large degree, complete wetting depending upon capillary time contact notwithstanding thoroughness of admixture of the liquid spray and gas.

Gas scrubbing in any form of washing tower is wholly dependent upon time contact of fume laden gas and the scrubbing liquid used, to effect satisfactory wetting and eliminaton of fume particles. In each of the above classes, without regard to practicable extent of time during which agitation is maintained, there is a considerable fume escape due to the passage of dry fume particles whose gaseous surface tension may be greater than the capillary attraction of the liquid for the particles during the desired time of passage of the mixture through the apparatus.

There is a considerable range of wetability of dust and fume particles which often necessitates a large increase of washing liquid, proportionate to the quantity of gas treated, with corresponding increase of power consumption and regardless of permissible time contact.

Recognizing these facts, it has been common practice to use apparatuses of the types hereinbefore referred to, in multiple, as many as 3 or 4 being placed in series to reduce the fume loss.

In none of these apparatuses, however, is it possible to obtain anything like a complete elimination of fume particles from the gas, although coarser "dust" may satisfactorily yield to the treatment. Obviously, any multiplication of apparatus leads to excessive installation and operating costs.

I have discovered that dust, fume and substantially any foreign content of a gas can be practically completely removed therefrom by passing the gas along a guiding surface or barrier and bombarding the passing gases with drops of liquid moving at such velocity that they perform a function not heretofore recognized, which function may be described as follows:

A turbulent condensate of the washing liquid continually forms upon the guiding surface and gas in contact with the condensate and transiently confined against this surface is subjected to impact, by the liquid drops, of sufficient force to suddenly destroy gaseous surface tension of dry entrained solids, the time involved for such tension destruction being substantially identical with the time of passage of the gas through the bombardment space of the apparatus.

The violent action incident to high velocity of the liquid drops causes rebound splash of the turbulent condensate which contributes to the washing action by oppositely acting forces and so violently scrubs the particles that any possible gas surface tension is overcome and a substantially complete wetting of the fume results without regard to capillary time upon which all previous gas washing largely depends.

Having wetted the fume particles, separation thereof from the gas may be readily effected as, for example, by subjecting the mixture to centrifugal action in a cyclone collector or any type of spray separator.

It will be obvious that extremely rapid and thorough contact of the gas with the washing liquid, induced by the high velocities employed in this method of gas treatment, may be advantageously used for gas absorption when treating gases which are appreciably soluble in the liquid employed, likewise, chemical reaction may be accelerated: I, therefore, do not restrict this invention to the wetting and removal of solids from gases, but also contemplate the use of the principle hereinbefore set forth in various treatments of gases, liquids and finely divided solids, in any case wherein the liquid used is caused to traverse the passing gas at a velocity in excess of 11,500 feet per minute and encounter a barrier in the manner hereinbefore described.

Figure 4:
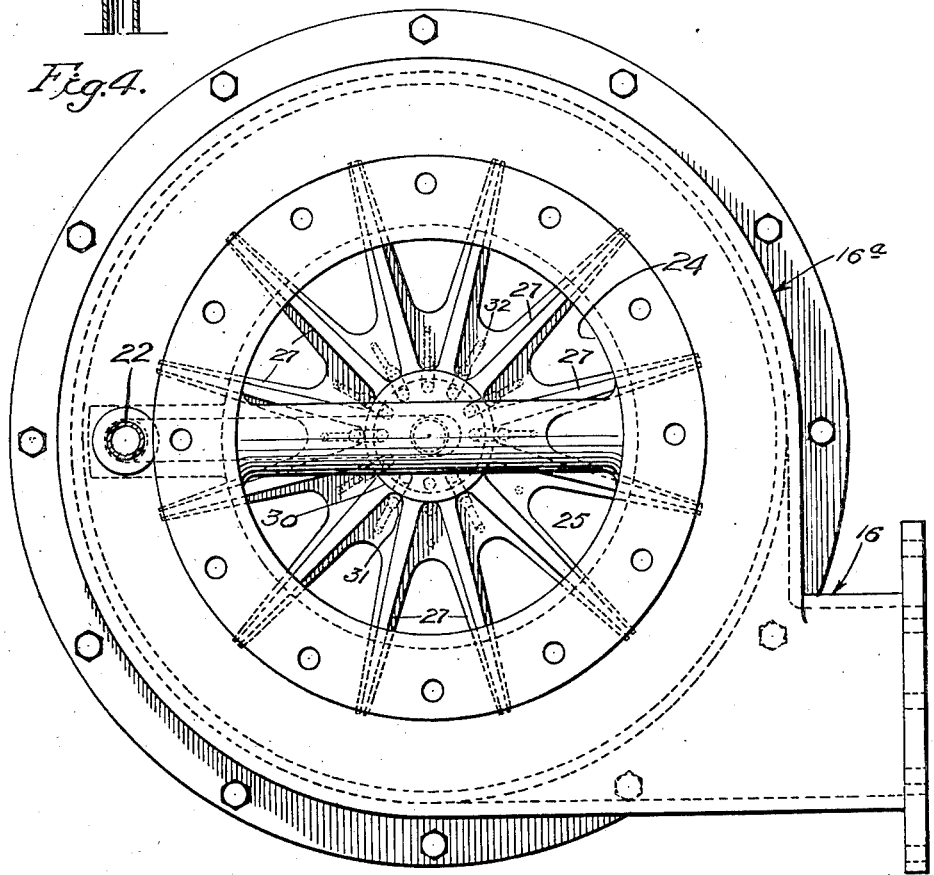
Figure 5:
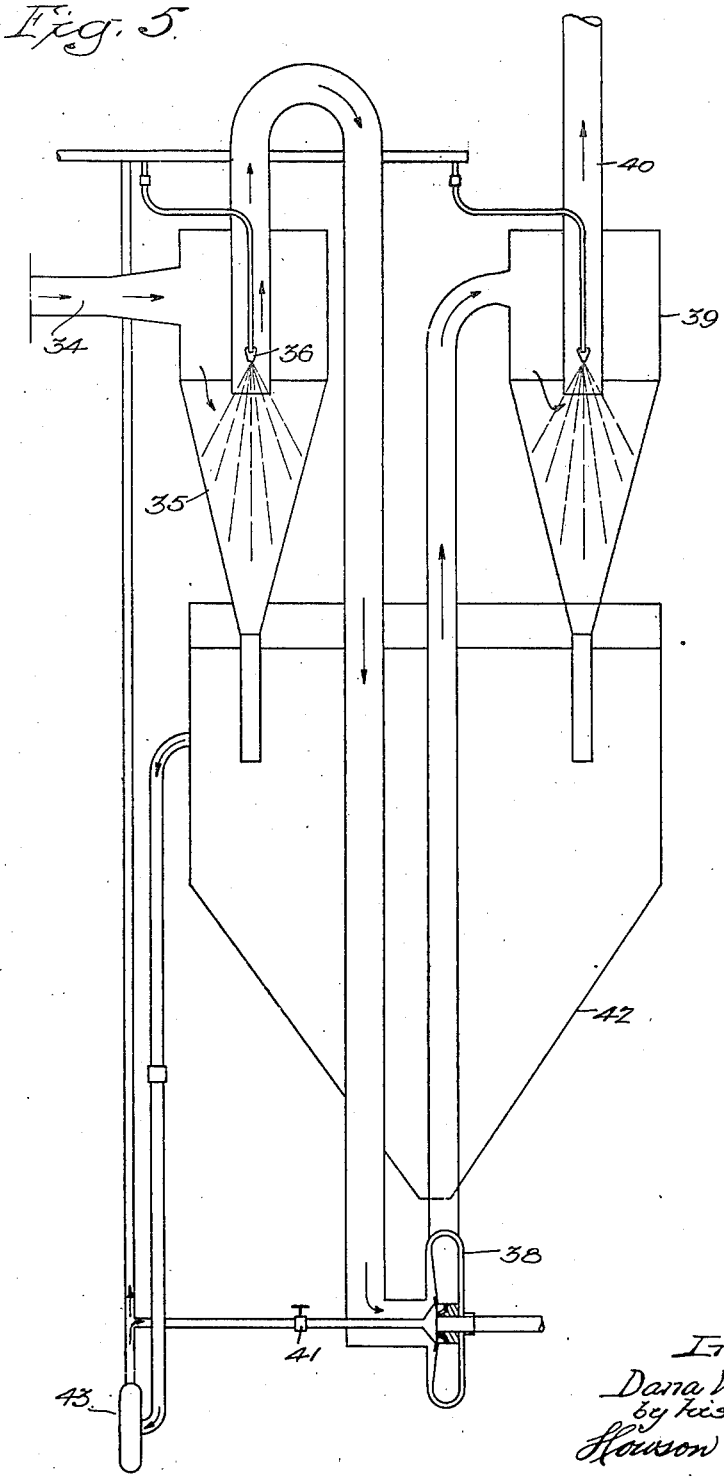

A convenient apparatus for carrying out this invention is illustrated in the accompanying drawings wherein:

Fig. 1 is a diagrammatic view of the apparatus;
Fig. 2 is a section on line 2—2 of Fig. 1;
Fig. 3 is a horizontal sectional view showing a blower design suitable for use in apparatus of this character and so constructed that both the functions of gas scrubbing and centrifugal separation of the condensates are accomplished therein;
Fig. 4 is a side elevation of the blower with the gas inlet removed; and
Fig. 5 is a diagrammatic view of an apparatus employed in testing the invention.

In Figs. 1 and 2 of the drawings, 10 generally designates the outlet of a furnace, which may be the outlet either of a metallurgical furnace, or any apparatus producing a commercial gas requiring scrubbing.

The furnace discharge opens into a quenching chamber 11 to which water or other quenching liquid is supplied through a conduit 12 leading into the upper end of the chamber. Water is withdrawn from the chamber through an outlet 13 at present shown as discharging into and sealed by the liquid in a sludge tank 14. Near its lower end, the quenching chamber has a gas outlet communicating with the intake of a centrifugal blower 16 which is preferably constructed with radially extending blades.

The discharge 17 of this blower has a terminal 18 extending tangential to and communicating with the centrifugal slime and gas separator 19. This slime and gas separator has at its lower end, a central outlet 21 discharging into the sludge tank 14. Means are provided admitting water in regulatable quantities at the axis of blower 16, this means being at present disclosed as a valved branch 22 of conduit 12. Conduit 12 receives its supply through a pump 23, the intake of which communicates with sludge tank 14. Tank 14 may be provided with a suitable sludge remover, not herein disclosed.

In Figs. 3 and 4, a structure is illustrated which may be conveniently employed as a centrifugal blower 16 of the apparatus just described. In these figures the numeral 16a indicates a casing closed at one side and having in its opposite side an axial inlet 24, leading to a blower chamber 25. Rotatable in the blower chamber is an impeller 26 comprising radial blades 27 which, as illustrated, may each be formed with an opening 28 of desired width, which should be relatively narrow as compared with the width of the blade, to guard against excessive misting of the liquid used in scrubbing but providing, however, for a small amount of misting which is desirable to properly humidify the gas.

The hub of the impeller, indicated at 29 and rotated from any suitable source, has a hollow terminal 30 with which the liquid inlet pipe 22 communicates and the body of this hub 29 has axially extending ports 31 communicating with the interior of the hollow terminal 30 and with radially extending ports 32 aligned with the blades 27. The peripheral wall of the impeller chamber is preferably spaced from the periphery of the impeller through a distance approximating one-eighth of the diameter of the impeller, where the impeller diameter is 20'', in order that drops of liquid leaving the impeller blade ends may impinge with considerable force against the peripheral wall.

Where the diameter of the impeller is increased, a corresponding increase in the radial distance of the peripheral casing from the periphery of the impeller may be made, care being taken in all instances that the distance is not sufficiently great to cause any serious loss of ballistic force of the drops.

The space between the periphery of the impeller and the peripheral wall of the impeller chamber should, however, be maintained at such size that it will just adequately accommodate the discharge from the impeller. By offsetting the discharge from the impeller chamber proper in the direction of the axis of the impeller, the rotative action of the mixture leaving the impeller chamber has a tendency to produce a considerable separation of condensate in the blower proper and before the mixture enters the separator 19. The peripheral wall is preferably internally lined with rubber, lead or any suitable wear-resisting material indicated at 33.

Tests with apparatus of this character at a peripheral speed greater than the minimum above set forth indicate that no trace of dry fume whatever passes beyond the separating chamber.

While I have above referred to the use of water as a wetting agent, any suitable liquid may be employed for this purpose. The performance of the apparatus shows the best results economically when the amount of liquid introduced through pipe 22 is just sufficient to provide a thorough wetting of the fume particles. This may be determined in operation by reducing the liquid admission until fume particles begin to appear on a filter disposed in the outlet 20. At this time the amount admitted should be slightly increased; from this point the amount of liquid may be increased without any escape of unwetted fume to the full capacity of the scrubbing means. Quite obviously, however, any increase of water beyond that necessary to proper wetting of the fume particles will result in a decreased power efficiency corresponding to the increased load placed upon the impeller and the increased delivery requirements for the pump 23.

Tests of this apparatus indicate that .5 to 2 gallons of liquid for each 100 cubic feet of gas treated is sufficient depending upon the character of the fume. As examples of efficiencies obtainable by use of apparatus of this character, reference is made to the following table of tests conducted under actual operating conditions in a large metal refinery.

| Test | Peripheral speed F. P. M. | Gas through scrubber. C. F. M. | Solution gals. per min. | Gals. solution per 100 C. F. M. gas | Fume recovery % elimination |
|---|---|---|---|---|---|
| A | 11,519 | 152 | 2 | 1.316 | 98.74 |
| B | 14,399 | 186 | 2 | 1.075 | 99.50 |
| C | 20,734 | 829 | 2 | 0.241 | 99.95 |
| D | 17,372 | 610 | 4 | 0.655 | 98.99 |
| E | 20,734 | 890 | 4 | 0.449 | 99.92 |
| F | 17,372 | 601 | 6 | 0.965 | 98.99 |
| G | 20,734 | 869 | 6 | 0.690 | 99.97 |
| H | 17,372 | 607 | 8 | 1.318 | 99.87 |
| I | 20,334 | 702 | 8 | 1.139 | 99.98 |

The experimental unit is diagrammatically illustrated in Fig. 5 and comprises an 8″ diameter inlet flue pipe 34 leading to a high velocity wet cyclone 35. This cyclone has a water or solution spray 36 in its outlet 37 spraying downwardly against the gas stream and washing the sides of the cone of the cyclone. This cools and humidifies the gas and removes coarser flue dust and a small portion of the fine fume. The humidified gas is drawn from the cyclone 35 to the scrubber 38.

The scrubber is of the type previously described and water or solution is piped thereto at the hub of the impeller. The product of the scrubber consisting of a dilute sludge, partially held in suspension in the gas passes together therewith to a second cyclone 39 where the wetted fume is dropped before the gas passes up through the final spray outlet stack 40, this final spray being used to assist in eliminating the wet entrainment from the effluent gas. The rate of water flow to the scrubber is regulated by a valve 41 and the impeller speed variation is obtained by a variable speed motor drive not herein disclosed. The bottoms of the two cyclones are water sealed in a settling storage tank 42 and a recirculating pump 43 returns water therefrom to the cyclone sprays and the scrubber impeller.

A study of the table given above reveals the fact that high efficiencies can be maintained throughout a relatively wide range of speeds and with a considerable variation in the amount of water delivered to the scrubber. The table clearly indicates that the amount of water employed should not be below .5 gallons per 100 cubic feet of gas; that with a constant water input the efficiency increases with impeller peripheral speed and that satisfactory elimination of fume solids from the gas cannot be expected at impeller peripheral speeds lower than 11,500 feet per minute. In fixing this minimum speed, it is considered that 98 per cent. elimination of fume content may be satisfactory. When coarser dust elimination is the primary object, lower speeds may be used with good results but in any case velocities of the water drops must be maintained greatly in excess of velocities employed in any other type of gas washing means in order for the principle of this invention to properly function. The tabled tests are selected from a long series of tests and this series clearly indicates that having the same peripheral velocity and the same quantity of water, the efficiency increases with the water to gas ratio, provided this increase is kept within reasonable limits.

Tests conducted by the means illustrated in Fig. 5, wherein an excess of water was used but no water was admitted axially to the impeller resulted in dust and fume elimination of only 91.48 per cent. of the original solids content of the gas, whereas test I in the above table shows an elimination of 99.98 per cent. of contained solids when 1.139 gallons of water per minute per 100 C. F. M. was admitted axially to the impeller.

Efficiency, as above referred to, has to do only with fume elimination from the gases and has no bearing on the general efficiencies of the apparatus; introduction of large quantities of water brings an increase in the required power, much greater than the increased power requirements resulting from increased velocities of the impeller.

Examination of the table will disclose the fact that at the speed used in A and B, a sharp decline in the amount of gas passed occurred. This was due to a corresponding decline in the static power of the scrubber incident to the lower speeds.

Metallurgical fume eliminated from entraining gases containing SO₂ and recirculated as a dilute sludge is leached of solubles such as zinc oxide or oxycarbonate with great facility due to the rapid contact afforded by the high velocities employed in this method. This accelerated solvent action was observed during the tests above referred to, the gases used being derived from smelter and convertor gases rich in zinc fume.

In regard to chemical reaction which is facilitated by this method of gas treatment, I have found that in the treatment of crude sodium phenolate solution, by contacting carbon dioxide gas therewith, the time required to complete the reaction resulting in the liberation of phenol and the simultaneous formation of sodium carbonate is greatly reduced and a higher yield of phenol results than in any previous method of conducting this reaction commercially, this is apparently due to the superior violent contacting of the gas to be absorbed, with the sodium phenolate solution, which solution, in this case, is used as the scrubbing liquid.

The degree and rapidity of absorption of gases in the scrubbing liquid are greatly increased by this method of gas treatment when working temperatures of gas and liquid are maintained at the proper degree consistent with the kinds of gas, liquid and other substances employed.

This method of gas treatment, therefore, offers distinct advantages in the production of commercial gases, such as $CO_2$, $SO_2$ and the like by absorption in and regeneration from the scrubbing liquid, the absorption being greatly facilitated by violent scrubbing inherent in the high velocity of the dispersed scrubbing liquid. Absorption of $SO_3$ in a strong solution of $H_2SO_4$ in the production of commercial sulphuric acid is contemplated in this method of gas treatment, another important application being absorption of phosphoric oxide in strong solution of orthophosphoric acid used as the scrubbing liquid.

The invention being capable of considerable modification without in any manner departing from the spirit thereof, I do not wish to be understood as limiting myself to either the particular method or apparatus hereinbefore set forth except as hereinafter claimed.

I claim:

1. The method of scrubbing gas to remove fume particles therefrom, comprising causing the gas to move along a barrier against which the gas is confined and bombarding the gas by relatively large drops of liquid moving substantially perpendicularly to the path of the gas and with a speed in excess of 11,500 feet per minute whereby said drops destroy the gaseous surface tension of contained fume particles.

2. The method of scrubbing gas to remove fume particles therefrom, comprising passing the gas through a radially bladed centrifugal blower while operating the blower at a peripheral speed in excess of 11,500 feet per minute and introducing liquid to the blower in such fashion that the major portion thereof flows along the blower blades substantially in the form of unbroken sheets which break, at the blade ends, into rows of relatively large drops, which drops leaving the said blade ends traverse the space between the said blade ends and the blower wall.

3. The method of claim 1 wherein the gas is under compression during bombardment thereof.

4. The method of claim 1 in which the gas is humidified before bombardment.

5. The method of claim 1 in which the gas is humidified before bombardment and compressed at the time of bombardment.

6. The method of gas treatment comprising causing the gas to move along a barrier against which the gas is transiently confined and bombarding the gas by relatively large drops of liquid moving at a velocity in excess of 11,500 feet per minute and with such force that said drops penetrate the gas and rebound from the barrier.

7. The method of claim 6 wherein the drops of liquid are caused to penetrate the flowing gas substantially perpendicular to the barrier.

8. The method of claim 6 wherein the bombarding liquid is recirculated and leaching of solids transferred from the input gas to the liquid is promoted by the violent contact of gas liquid and entrained solids.

9. The method of claim 1 wherein the bombarding liquid is recirculated.

10. The method of claim 2 wherein the bombarding liquid is recirculated.

11. The method of claim 16 wherein the gas is under compression during bombardment thereof.

12. The method of gas scrubbing comprising passing the gas through a radially bladed centrifugal blower while operating the blower at high speed and introducing liquid to the blower in such fashion that the major portion of the liquid flows along the blower blades substantially in the form of unbroken sheets which break at the blade ends into rows of relatively large drops, which drops leaving the blade ends traverse the space between said blade ends and the blower wall.

13. The method as claimed in claim 12 wherein the liquid introduced to the blower is recirculated.

14. The method of gas scrubbing comprising passing the gas between the ends of the blades of a rapidly rotating radially bladed impeller and a wall opposed to the ends of such blades and introducing liquid at the hub of the impeller in such fashion that the major portion of the liquid flows along the impeller blades substantially in the form of unbroken sheets which break at the blade ends into rows of relatively large drops, which drops leaving the blade ends traverse the space between the blade ends and said wall and scrub the gas passing therebetween.

15. The method as claimed in claim 14 wherein the liquid introduced to the impeller is recirculated.

DANA W. BOWERS.